(No Model.)

A. T. CEFREY.
FLORAL FIGURE.

No. 489,218. Patented Jan. 3, 1893.

Witnesses.
Robert T. Keefe
A. B. Brown

Inventor.
Arsène Theodore Cefrey.
pr Lemuel P. Jenks. Atty.

UNITED STATES PATENT OFFICE.

ARSÈNE THEODORE CEFREY, OF BOSTON, MASSACHUSETTS.

FLORAL FIGURE.

SPECIFICATION forming part of Letters Patent No. 489,218, dated January 3, 1893.

Application filed July 16, 1891. Serial No. 399,787. (No model.)

*To all whom it may concern:*

Be it known that I, ARSÈNE THEODORE CEFREY, a citizen of the United States, residing at the city of Boston, in the county of Suffolk and State of Massachusetts, have invented a new and useful Floral-Figure Coating, of which the following is a specification.

The nature of my invention is that of using sawdust of wood, artificially dyed of any desirable color, as a covering or coating for floral letters and other figures, the sawdust being cemented to said figures and a portion or, at pleasure, the whole of said sawdust being of sufficiently large size grains as to imitate the ground up leaves of the "immortelles" or "everlasting" flowers (the *Helichrysium arenarium*) or such flowers as may have been heretofore used. And the object is, by the use of this sawdust, to save the enormous expense of the immortelle flowers, and the grinding, dyeing and sifting of the same, by the use of sawdust which costs less than one fortieth part of the cost of the flowers.

Figure 1:
Figure 2:
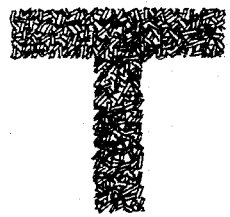
Figure 3:
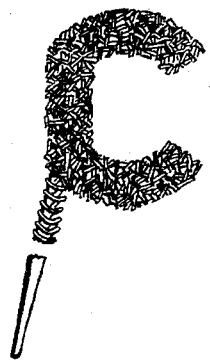

In the drawings Figures 1, 2 and 3 are, respectively, views of the letters A, T and C, formed and covered with the dyed and dried sawdust, after the manner in which I propose to use the said sawdust.

I will premise that I was the inventor of the floral letters and figures formerly and still, to some extent, used which letters were and are made by winding fine wire round the dyed and dried whole flowers, forming the device operated on to its desired shape, and availing of the retention of the wire or wires in its or their bent form to keep the letter in the desired shape. The projection beyond the wires of a large proportion of the petals of the bound-together flowers makes unnecessary the use of any ground up flowers or sawdust. But the letters produced are clumsy, fragile and costly and therefore unsatisfactory. I never patented them. But my United States Patent No. 407,331, dated July 23, 1889, covered a great improvement in stamping the figures from pasteboard. In the further improvement of these figures (and letters) subject of the present patent, I now stamp out from a sheet of pasteboard or of wood veneer, my letters and figures. To make these letters of a purple color, I take a mixture of fine and coarse wood sawdust, properly dyed and dried, (dyeing by immersion) and having covered the letters with cement, (glue or other substance,) I put the letters into a pile of the prepared sawdust, shaking them carefully together, to insure the sufficiency and uniformity of the coating. Withdrawing them then from the sawdust-containing vessel, I thoroughly dry them and they are then fit for use, in being attached to mortuary wreaths or crosses or for placing above graves, on Decoration Day or other occasions. The letters selected indicate the name formerly borne by the deceased; if it is a military funeral, the number and location of his regiment. Perhaps some sentiment may be expressed also, as Rest in Peace. These letters of mine are used also at merry meetings and other festive occasions, bearing perhaps the words Good Luck. My letters, perfectly shaped, beautifully colored, bearing handling and permanent as desired when in use, besides their well-effected purpose of giving information, add a new beauty to the wreath or other object upon which they are placed. I sometimes make my letters and figures of a mixture of tar and asphaltum with gum shellac in appropriate proportions, the latter article showing the same behavior,—being softened and rendered flexible,—on submitting the compound to the gentle heat of a lamp. And I fasten the letters to the wreath or other object by means of fine bent wire, whose joining upper ends are attached to the letter and the lower loose ends twisted round the upper end of a small projecting stick, for which purpose I generally use the little strips of wood commonly manufactured for and used as toothpicks. The present cost of the immortelles covering I figure up as eighty-seven dollars and seventy-five cents per barrel full. Cost of my sawdust per barrel, two dollars.

I do not claim a mixture of fine sawdust and flock, as a preliminary or other coating to my floral figures, nor do I claim a coating of ground-up "immortelle" petals, whether with or without sawdust and flock.

I claim nothing herein as of my own invention except the combination of the figures and the sawdust under the conditions as defined in my claim.

I claim

A florist's letter or figure stamped from a sheet of pasteboard or other suitable material, having an adhesive coating applied thereto, and an outer covering of granules of sawdust appropriately colored to represent the petals of the *Helichrysum arenarium*, substantially as described.

ARSÈNE THEODORE CEFREY.

Witnesses:
LEMUEL P. JENKS,
HENRY F. TUCKER.